US008026818B2

(12) United States Patent
Cote et al.

(10) Patent No.: US 8,026,818 B2
(45) Date of Patent: Sep. 27, 2011

(54) EAS AND UHF COMBINATION TAG

(75) Inventors: Andre Cote, Williamstown, NJ (US); Jack Mingle, Sicklerville, NJ (US); Anthony Piccoli, Audubon, NJ (US)

(73) Assignee: Checkpoint Systems, Inc., Thorofare, NJ (US)

( * ) Notice: Subject to any disclaimer, the term of this patent is extended or adjusted under 35 U.S.C. 154(b) by 464 days.

(21) Appl. No.: 11/955,917

(22) Filed: Dec. 13, 2007

(65) Prior Publication Data

US 2008/0150719 A1    Jun. 26, 2008

Related U.S. Application Data

(60) Provisional application No. 60/871,016, filed on Dec. 20, 2006.

(51) Int. Cl.
*B60R 25/00* (2006.01)
*H01F 5/00* (2006.01)
(52) U.S. Cl. .................................... 340/572.7; 336/200
(58) Field of Classification Search ....... 340/571–572.9, 340/568.1, 540, 500, 10.1–10.6; 336/200, 336/232; 343/895
See application file for complete search history.

(56) References Cited

U.S. PATENT DOCUMENTS

| 4,118,693 | A | | 10/1978 | Novikoff |
|---|---|---|---|---|
| 4,920,335 | A | * | 4/1990 | Andrews .................... 340/572.3 |
| 5,510,769 | A | | 4/1996 | Kajfez et al. |
| 5,517,195 | A | | 5/1996 | Narlow et al. |
| 5,541,399 | A | | 7/1996 | de Vall |
| 5,604,485 | A | | 2/1997 | Lauro et al. |
| 5,781,110 | A | * | 7/1998 | Habeger et al. ............ 340/572.5 |
| 5,859,587 | A | | 1/1999 | Alicot et al. |
| 5,861,809 | A | * | 1/1999 | Eckstein et al. ........... 340/572.3 |
| 6,100,804 | A | | 8/2000 | Brady et al. |
| 6,104,278 | A | | 8/2000 | Altwasser |
| 6,104,311 | A | * | 8/2000 | Lastinger ................... 340/10.51 |
| 6,121,878 | A | | 9/2000 | Brady et al. |
| 6,147,662 | A | | 11/2000 | Grabau et al. |
| 6,154,137 | A | | 11/2000 | Goff et al. |
| 6,172,608 | B1 | * | 1/2001 | Cole .......................... 340/572.1 |

(Continued)

FOREIGN PATENT DOCUMENTS

FR    2901041    11/2007

(Continued)

OTHER PUBLICATIONS

Rao, K.V. Seshagiri, Nikitin, Pavel V., Antenna Design for UHF RFID Tags: A Review and a Practical Application, IEEE Transactions on Antennas and Propagation, vol. 53, No. 12, Dec. 2005.

(Continued)

*Primary Examiner* — Benjamin C Lee
*Assistant Examiner* — Sigmund Tang
(74) *Attorney, Agent, or Firm* — Caesar, Rivise, Bernstein, Cohen & Pokotilow, Ltd.

(57) ABSTRACT

A combination EAS and UHF security tag that adds the ability to add item level UHF functionality to a retail tag and maintain the integrity of the EAS systems installed in the business and whereby the EAS and UHF security elements are substantially formed from a common conductive layer. This combination tag also includes the ability to change a tag from a "far-field read" tag to a "near-field read" tag.

6 Claims, 9 Drawing Sheets

U.S. PATENT DOCUMENTS

| | | |
|---|---|---|
| 6,181,287 B1 | 1/2001 | Beigel |
| 6,320,509 B1 | 11/2001 | Brady et al. |
| 6,567,050 B1 | 5/2003 | Briggs |
| 6,600,420 B2 | 7/2003 | Goff et al. |
| 6,665,193 B1 | 12/2003 | Chung et al. |
| 6,814,284 B2 | 11/2004 | Ehlers et al. |
| 6,837,438 B1 | 1/2005 | Takasugi et al. |
| 6,854,647 B2 | 2/2005 | Collins, Jr. et al. |
| 6,861,993 B2 | 3/2005 | Waldner |
| 6,940,408 B2 | 9/2005 | Ferguson et al. |
| 6,946,958 B2 | 9/2005 | Gundlach et al. |
| 7,075,437 B2 | 7/2006 | Bridgelall et al. |
| 7,088,249 B2 | 8/2006 | Senba et al. |
| 7,088,304 B2 | 8/2006 | Endo et al. |
| 7,109,867 B2 | 9/2006 | Forster |
| 7,123,151 B2 | 10/2006 | Garber et al. |
| 7,129,843 B2 | 10/2006 | Piccoli et al. |
| 7,345,583 B2 | 3/2008 | Reid et al. |
| 7,417,549 B2 * | 8/2008 | Cathey .................. 340/572.7 |
| 7,417,599 B2 | 8/2008 | Goff et al. |
| 7,498,948 B1 | 3/2009 | Gudeman et al. |
| 7,501,954 B1 * | 3/2009 | Chung .................. 340/572.7 |
| 7,510,985 B1 * | 3/2009 | Boenke et al. .......... 438/795 |
| 7,528,727 B2 | 5/2009 | Morrow |
| 7,557,757 B2 | 7/2009 | Deavours et al. |
| 7,804,411 B2 * | 9/2010 | Copeland ............... 340/572.7 |
| 2002/0017993 A1 | 2/2002 | Blama et al. |
| 2002/0097153 A1 * | 7/2002 | Youbok et al. ......... 340/572.5 |
| 2004/0089707 A1 | 5/2004 | Cortina et al. |
| 2004/0233042 A1 * | 11/2004 | Piccoli et al. ............. 340/10.1 |
| 2004/0263319 A1 | 12/2004 | Huomo |
| 2005/0184872 A1 * | 8/2005 | Clare et al. .............. 340/572.1 |
| 2006/0049947 A1 | 3/2006 | Forster |
| 2007/0024423 A1 * | 2/2007 | Nikitin et al. ............. 340/10.1 |
| 2007/0090955 A1 | 4/2007 | Cote et al. |
| 2007/0146142 A1 | 6/2007 | Cote |
| 2007/0238245 A1 | 10/2007 | Cote et al. |
| 2008/0143535 A1 * | 6/2008 | Fischer .................. 340/572.7 |
| 2008/0150719 A1 * | 6/2008 | Cote et al. .............. 340/572.1 |
| 2010/0001079 A1 * | 1/2010 | Martin et al. ............ 235/492 |

FOREIGN PATENT DOCUMENTS

| | | |
|---|---|---|
| WO | 02/29929 | 4/2002 |
| WO | 0239379 | 5/2002 |
| WO | 2004/104958 | 12/2004 |
| WO | 2005/074402 | 8/2005 |
| WO | 2005/119617 | 12/2005 |
| WO | 2006055653 | 5/2006 |
| WO | WO 2006055653 A1 * | 5/2006 |
| WO | WO 2006064540 A1 * | 6/2006 |
| WO | WO 2006110105 A1 * | 10/2006 |
| WO | 2007/135269 | 11/2007 |

OTHER PUBLICATIONS

International Search Report, PCT/US2007/088003, dated May 28, 2008.

* cited by examiner

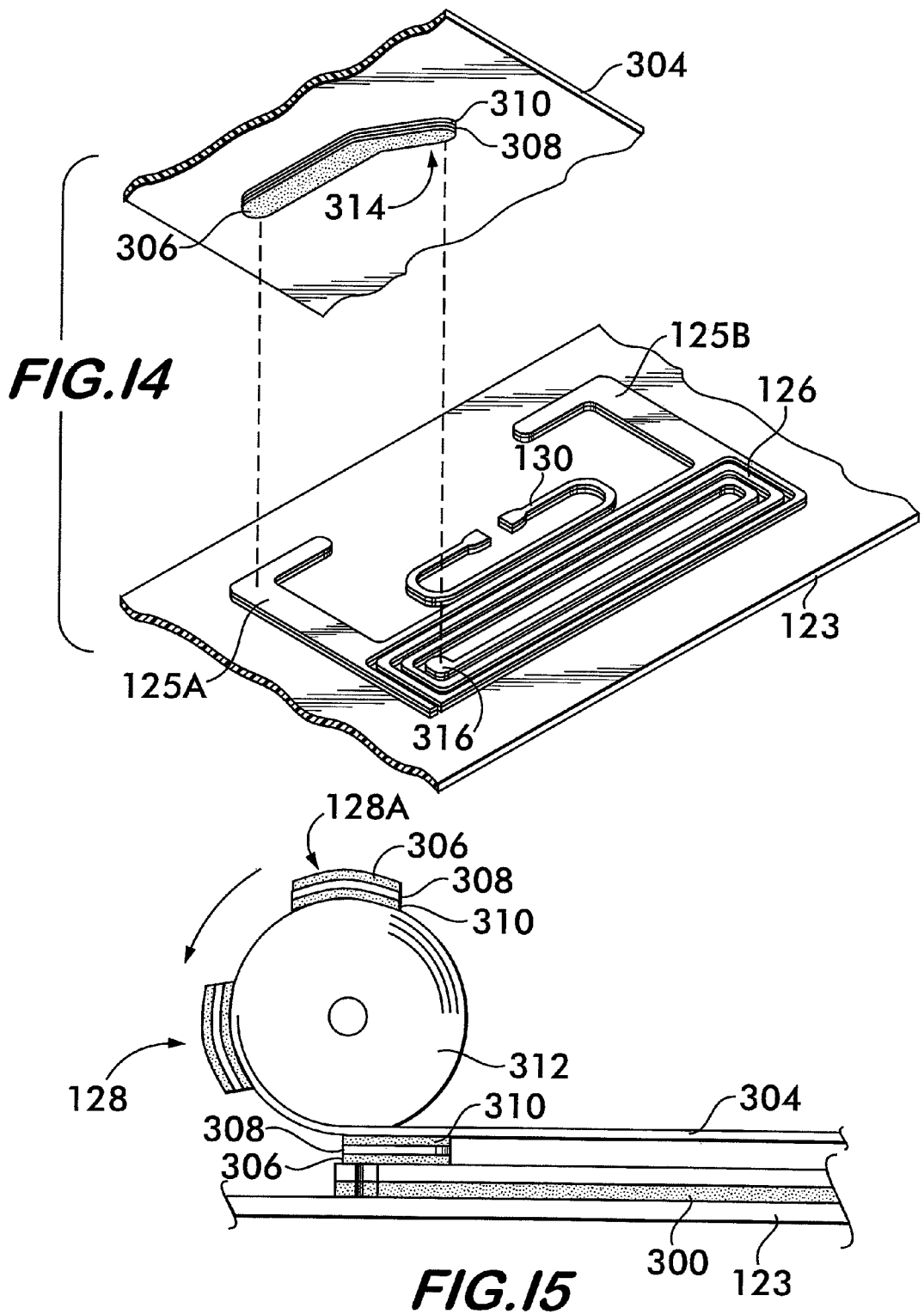

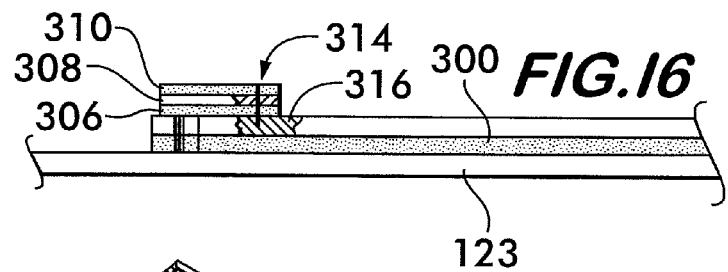
FIG.16
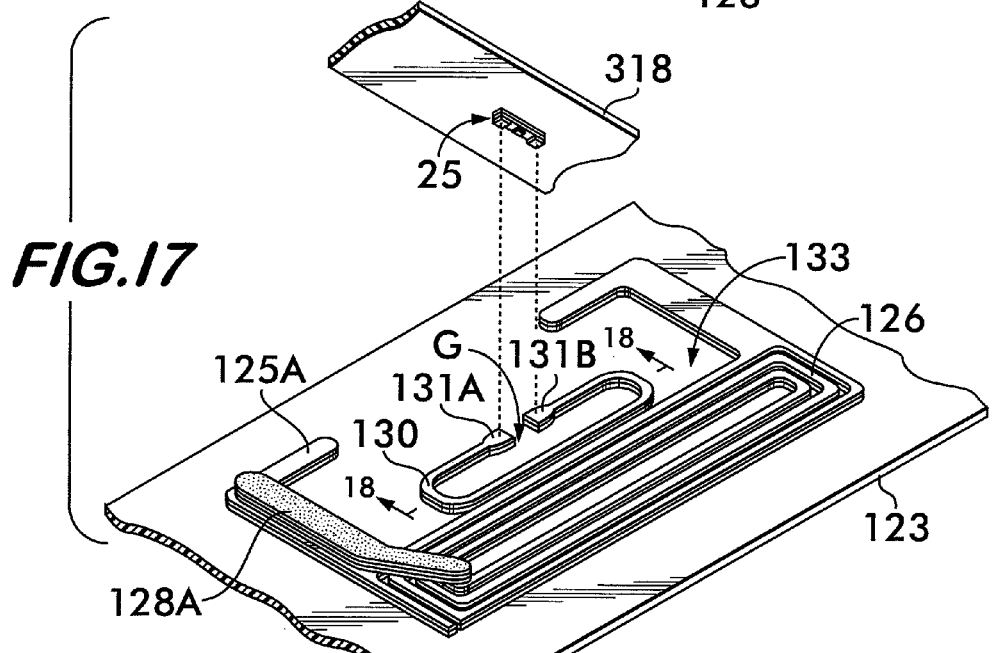
FIG.17
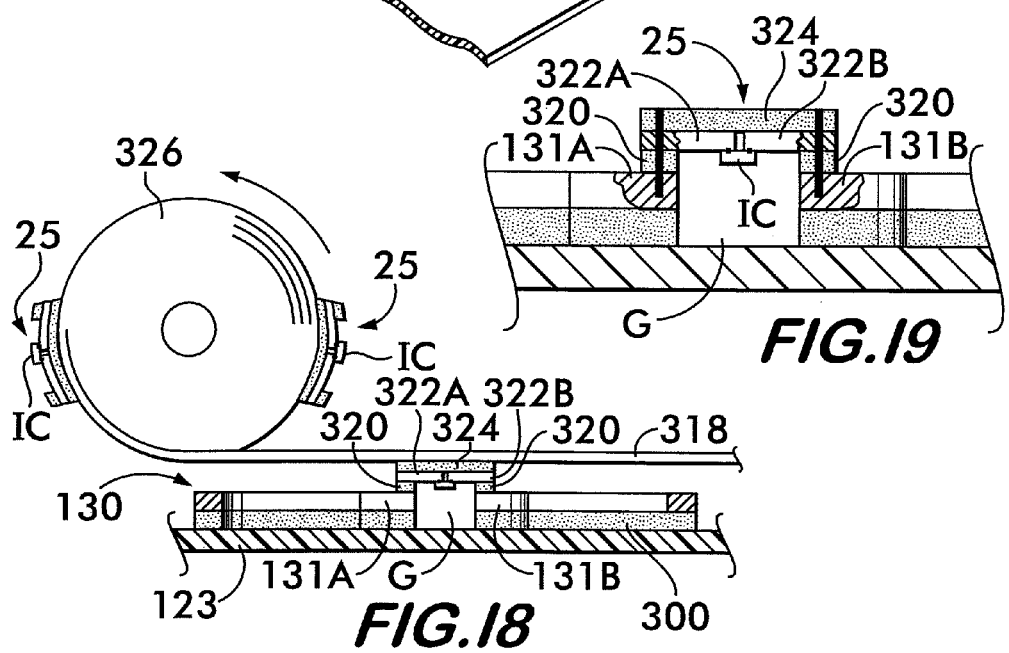
FIG.19
FIG.18

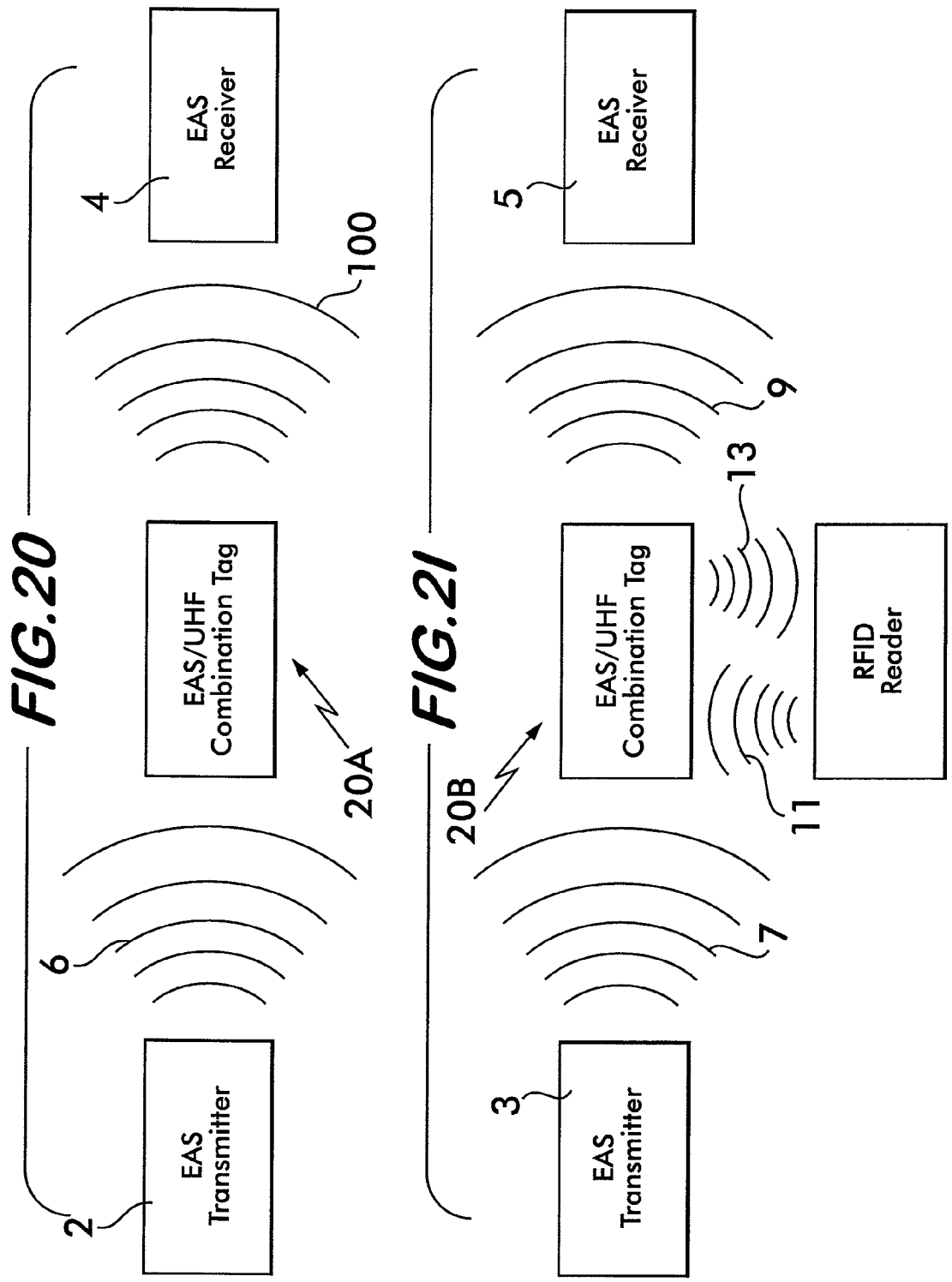

EAS AND UHF COMBINATION TAG

CROSS-REFERENCE TO RELATED APPLICATIONS

This utility application claims the benefit under 35 U.S.C. §119(e) of Provisional Application Ser. No. 60/871,016 filed on Dec. 20, 2006 entitled EAS AND UHF COMBINATION TAG and whose entire disclosure is incorporated by reference herein.

BACKGROUND OF THE INVENTION

1. Field of Invention

The current invention relates to security tags and more particularly, discloses a combination electronic article surveillance and ultrahigh frequency tag, and method of making the same.

2. Description of Related Art

Tracking or detecting the presence or removal of retail items from an inventory or retail establishment comes under the venue of electronic article surveillance (EAS), which also now includes radio frequency identification (RFID). EAS or RFID detection is typically achieved by applying an EAS or RFID element as part of a security tag to the item or its packaging and when these security tags are exposed to a predetermined electromagnetic field (e.g., pedestals located at a retail establishment exit), they activate to provide some type of alert and/or supply data to a receiver or other detector.

It has become desirable to include two elements on, or in, a single security tag wherein each security element responds to a different interrogator/reader system. By way of example only, two EAS elements, or two RFID elements or an EAS element and an RFID element may be positioned on or in a single security tag. See U.S. Pat. No. 5,510,769 (Kajfez, et al.); U.S. Pat. No. 5,517,195 (Narlow, et al.); and U.S. Pat. No. 7,109,867 (Forster). Thus, it may be desirable to read the RFID element of a tag attached to an article for inventory purposes while interrogating the EAS element if the tagged article should be removed from a store exit without having been purchased. Other variations of providing loop/antenna configurations on a single substrate are exemplified by Texas Instrument's Dallas Inlay or Impinj's Propellor.

Commonly-owned U.S. Pat. No. 7,129,843 (Piccoli, et al.) entitled "LC Resonant Circuit with Amplification Device" discloses an amplification shield that surrounds an EAS circuit. Commonly-owned U.S. application Ser. No. 11/540,000 filed Oct. 10, 2006 entitled "Security Tag for Cigarette Pack" (U.S. Patent Application Publication No. 2007/0146142) discloses a security tag formed from the metal liner of a cigarette pack whereby a security element is surrounded by a metal path. Both of these references are incorporated by reference herein.

However, there remains a need for manufacturing a combined security element that combines EAS with UHF characteristics using the same conductive material, as well providing an enhanced EAS response signal. Furthermore, there remains a need to deactivate the far-field reading capability of a security tag while maintaining a near-field read capability.

All references cited herein are incorporated herein by reference in their entireties.

BRIEF SUMMARY OF THE INVENTION

A security tag comprising an electronic article surveillance (EAS) element and an ultrahigh frequency (UHF) element including an RFID integrated circuit. The UHF element is positioned adjacent the EAS element wherein the UHF element substantially surrounds the EAS element.

A security tag comprising an electronic article surveillance (EAS) element and an ultrahigh frequency (UHF) element having portions that are formed from a common conductive layer.

A method of producing a security tag comprising an electronic article surveillance (EAS) element and an ultrahigh frequency (UHF) element including an RFID integrated circuit. The method comprises: providing a substrate; applying an adhesive to the substrate in a pattern corresponding to the EAS element and to the UHF element; applying a conductive layer to the adhesive; cutting the conductive layer to form a portion of the EAS element and a portion of the UHF element; applying an RFID chip strap to the UHF element and a capacitor strap or a capacitor plate to the EAS element; and electrically coupling the RFID chip strap to the UHF element and the capacitor strap or the capacitor plate to the EAS element.

BRIEF DESCRIPTION OF SEVERAL VIEWS OF THE DRAWINGS

The invention will be described in conjunction with the following drawings in which like reference numerals designate like elements and wherein:

FIG. 14 depicts a laminate comprising a releasably secured upper capacitor plate that is registered for application on top of the formed coil;

FIG. 15 is side view of an application station depicting how the upper capacitor plate is applied to the coil;

FIG. 16 depicts how the upper capacitor plate is crimped in place to form an electrical connection with the coil;

FIG. 17 depicts a laminate comprising a releasably secured chip strap is registered for application on top of the loop antenna;

FIG. 18 is a cross-sectional view taken along line 18-18 of FIG. 17 showing the RFID chip strap positioned on the loop antenna;

FIG. 19 is a cross-sectional view of the RFID chip strap showing it electrically coupled to the loop antenna;

FIG. 20 is a transmitter/receiver system for the combination EAS/UHF tag of FIG. 1;

FIG. 21 is a transmitter/receiver system for the combination EAS/UHF tag of FIG. 2;

DETAILED DESCRIPTION OF THE INVENTION

The present invention involves the combination of an EAS security element along with an RFID UHF (ultrahigh frequency) security element. The present invention adds the ability to add item level UHF functionality to a retail tag and maintain the integrity of the EAS systems installed in the business. In the past, the goal has been to discard the EAS system and EAS tags and replace these with an entire RFID system and RFID tags. In a first embodiment 20A of the present invention, the close proximity of the RFID UHF security element enhances the response signal of the EAS security element. In a second embodiment 20B of the present invention, an EAS security element, using a coil and capacitor configuration, is augmented by integral dipole antenna elements and substantially surrounds an RFID UHF security element. In both embodiments, the majority of these dual security elements are formed from a common conductive layer, thereby making the production of these dual security elements cost effective.

Conventional EAS security elements include a resonant circuit formed of a capacitor and multi-turn coil which are electrically coupled and are usually tuned to approximately an 8.2 MHz frequency range. RFID security elements include an RFID IC electrically coupled to an antenna tuned to a 13.56 MHz frequency or higher. As the frequency increases, the distance at which a security tag can be detected (also referred to as a "read distance") also increases. Thus, it is desirable to operate the EAS and RFID security elements at higher frequencies, especially at ultrahigh frequencies, UHF, (e.g., 850 MHz-1200 MHz). Typically the EAS security element and the RFID security element are formed using two independent processes.

Figure 1:
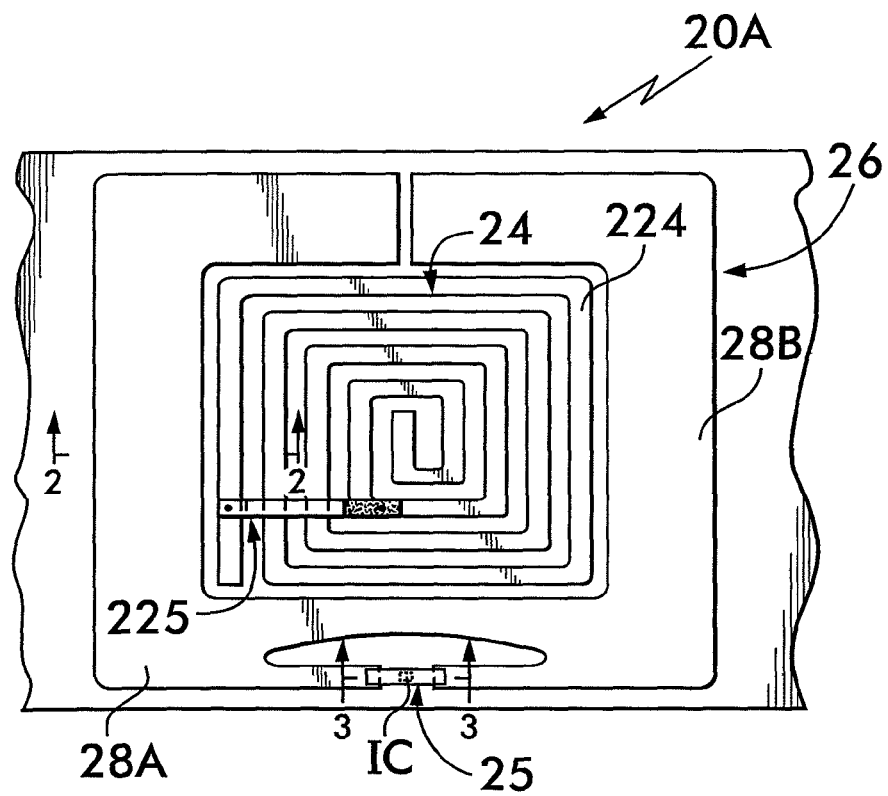
FIG. 1 is a plan view of a first embodiment of a combination EAS/UHF tag that exhibits enhanced EAS response signal characteristics and which shows an EAS security element using a capacitor strap substantially surrounded by an RFID UHF security element.
Figures 7, 8:
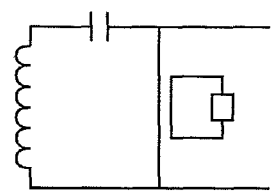
FIG. 7 is an equivalent circuit of the combination EAS/UHF tag of FIG. 1.
FIG. 8 is an equivalent circuit of the combination EAS/UHF tag of FIG. 2.

FIG. 1 is plan view of a combination EAS/UHF tag 20A that exhibits enhanced EAS response signal characteristics. FIG. 7 is an equivalent circuit of the EAS/UHF tag 20A. In particular, the tag 20A includes an EAS security element 24 and a UHF security element 26. The EAS security element comprises a coil 224 and capacitor. By way of example only, the capacitor may comprise a capacitor strap 225 that can be electrically connected to the coil 224 to form a resonant circuit; the details of a capacitor strap are disclosed in U.S. Pat. No. 7,646,305 (Cote, et al.) entitled "Capacitor Strap" and whose entire disclosure is incorporated by reference herein and which is also owned by the same Assignee as the present application, namely, Checkpoint Systems, Inc. Thus, by applying the capacitor strap 225 to the coil 224, the EAS security element is then tuned to a particular frequency range that responds with a characteristic response signal to a corresponding interrogator or reader; by way of example only, the EAS security element 24 may be tuned to approximately 8.2 MHz. The UHF security element 26 includes an RFID integrated circuit (IC), which is implemented as a "chip strap," 25 which is electrically coupled to an antenna, typically a dipole antenna (formed by dipole elements 28A and 28B). Recently, the attachment of the IC has been accomplished by electrically-coupling conductive flanges to respective IC contacts to form the chip strap 25. See for example U.S. Pat. No. 6,940, 408 (Ferguson, et al.); U.S. Pat. No. 6,665,193 (Chung, et al.); U.S. Pat. No. 6,181,287 (Beigel); and U.S. Pat. No. 6,100,804 (Brady, et al.), as well as U.S. Pat. No. 7,646,305 (Cote al.), and all of which are incorporated by reference herein.

However, as part of the invention 20A of the present application, it has been determined that by positioning the UHF security element 26 to substantially surround the EAS security element 24 to form the "combination tag", the EAS security element response signal is enhanced and thus can be read or "seen" at a significantly greater distance as compared to the EAS security element response signal without the close proximity of the UHF security element 26. It is believed that the close proximity of the surrounding UHF security element 26 increases the electromagnetic flux applied to the EAS security element 24. Moreover, the surrounding UHF security element 24 acts as static electricity protection to the EAS security element 24 in that static charge tends to discharge through the UHF security element 26, rather than through the EAS security element 24.

In particular, FIG. 20 depicts an EAS transmitter 2 and EAS receiver 4. When the EAS transmitter 2 emits an interrogation signal 6, the EAS/UHF tag response signal 100 can be detected at a much greater distance than a conventional EAS tag. Table 1 sets forth the response data of the EAS security element 24 by itself ("EAS Alone"), the EAS security element 24 with the closely-adjacent UHF security element 26 ("EAS w/Dipole") and the UHF security element 26 by itself ("UHF"). As can be seen from the data, the amplitude of the EAS w/Dipole was increased as compared to the amplitude of the EAS alone. This is manifested in being able to read the EAS security element 24 at a greater distance beyond the near field (e.g., 3-5 feet). Moreover, when compared to the response signal of Checkpoint System Inc.'s "gold standard" (GST), which is Checkpoint's Series 410 tag, the GST rating of 1 or better was achieved using the combination tag.

TABLE 1

| | EAS Alone | | | | EAS w/Dipole | | | | UHF | |
|---|---|---|---|---|---|---|---|---|---|---|
| | Freq | Amp | Q | GST | Freq | Amp | Q | GST | Freq | Read Dist |
| 1 | 8.19 | 0.36 | 62.53 | 0.85 | 8.21 | 0.42 | 59.63 | 1.00 | 1150.00 | <1 ft |
| 2 | 8.10 | 0.40 | 67.00 | 0.95 | 8.14 | 0.47 | 69.40 | 1.13 | 1150.00 | N/R |
| 3 | 8.03 | 0.39 | 68.50 | 0.95 | 8.07 | 0.46 | 69.90 | 1.11 | 1150.00 | N/R |
| 4 | 8.21 | 0.36 | 63.34 | 0.86 | 8.24 | 0.42 | 62.56 | 1.01 | 1140.00 | <1 ft |

Figure 2:
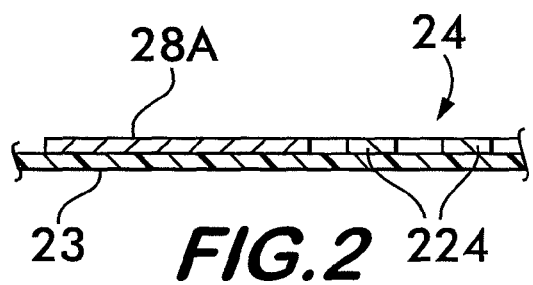
FIG. 2 is a cross-sectional view of the first embodiment taken along line 2-2 of FIG. 1.
Figure 3:
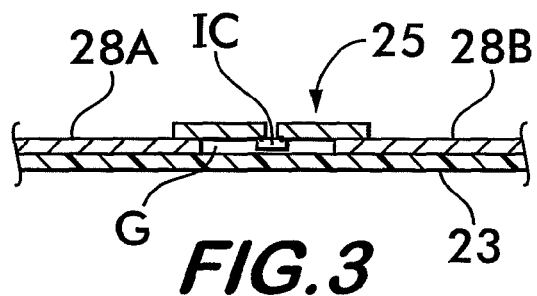
FIG. 3 is a cross-sectional view of the first embodiment taken along line 3-3 of FIG. 1.

FIGS. 2-3 depict the construction of the combination tag 20A. As can be seen from FIG. 2, the tag 20A is supported on a carrier or substrate 23 to which the EAS security element 24 is attached. Similarly, the dipole elements 28A/28B of the UHF security element 26 are also secured to the carrier or substrate 23. FIG. 3 shows how the chip strap 25 is coupled across a gap G between the dipole elements 28A and 28B. It should be understood that the formation of the EAS security element 24 and UHF security element 26 of the combination tag 20A is similar to the formation of the combination EAS/UHF tag 20B to be discussed next. In addition, the formation of the EAS security element 24 individually and the UHF security element 26 individually are shown in U.S. Pat. No. 7,646,304 (Cote al.) entitled "Transfer Tape Strap Process" and whose entire disclosure is incorporated by reference herein.

It should be noted that the advantage of the combination tag 20A over commonly-owned U.S. Pat. No. 7,129,843 (Piccoli, et al.) and U.S. Patent Application Publication No. 2007/0146142 (both mentioned previously) is, among other things, the creation of two security elements (e.g., an RFID dipole and EAS resonant circuit) from common layers while effecting the enhancement of the EAS circuit response signal. As mentioned previously, this provides a large benefit to customers by making the overall security tag adaptable for different detection systems.

Figure 4:
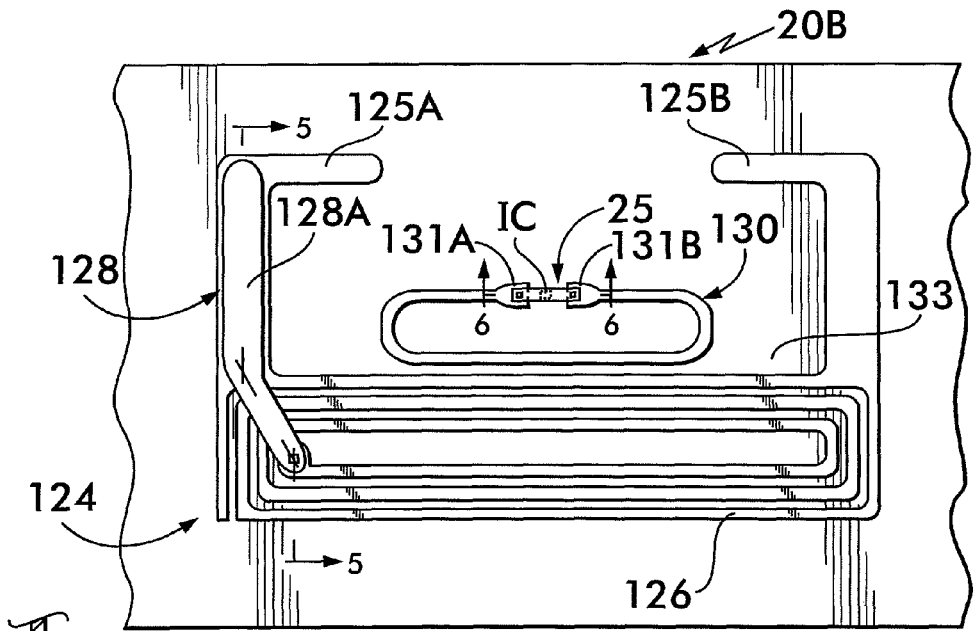
FIG. 4 is a plan view of a second embodiment of a combination EAS/UHF tag that is formed to have an integrated dipole configuration with the coil portion of the EAS element.

FIG. 4 depicts a combination EAS/UHF tag 20B whereby an EAS security element 124, using a coil 126 and capacitor 128 configuration, is augmented by integral dipole antenna elements 125A and 125B, and all of which are formed from a common conductive layer. Unlike the first embodiment 20A where enhancement of the EAS circuit response signal is one of the key features of that embodiment, the important feature of the EAS/UHF tag 20B is the construction of a dual tag (EAS and RFID) using common layers of material. FIG. 8 is an equivalent circuit of the EAS/UHF tag 20B. In particular, the dipole elements 125A/125B are integrally-formed with a coil 126. The capacitor 128 is formed by one of the dipole elements 125A and an additional capacitor plate 128A which is positioned over the dipole element 125A with a dielectric disposed between dipole element 125A and the plate 128A. An RFID IC is electrically coupled to a loop antenna 130 that is also positioned closely adjacent the EAS security element 124 inside an area 133 defined beyond portions of the elements 125A/125B and the coil 126. By itself, the loop antenna 130 is tuned to a first UHF frequency (e.g., 700 MHz). However, by positioning the EAS security element 124 closely adjacent the loop antenna 130, the RFID signal emitted by the loop antenna 130 is enhanced (e.g., the loop antenna 130 is tuned to a higher frequency, e.g., 860-950 MHz range), thereby being readable at a farther distance. FIG. 21 depicts an EAS transmitter 3 and EAS receiver 5. When the EAS transmitter 2 emits an interrogation signal 7, the EAS security element 124 responds to the tuned frequency by emitting response signal 9. When an RFID reader signal 11 is emitted, the UHF security element provides a response signal 13 to the RFID reader. Table 2 depicts the characteristic of this embodiment 20B.

TABLE 2

| | EAS | | | | UHF | | |
|---|---|---|---|---|---|---|---|
| | Freq | Amp | Q | QST | Freq | Read Dist | Read on Parch |
| 1 | 8.1115 | 0.35 | 52.3 | 0.86 | 884 | 11 | 16 |
| 2 | 8.49 | 0.35 | 50.2 | 0.86 | 901 | 15 | 20 |
| 3 | 8.194 | 0.35 | 54.3 | 0.85 | 899 | 18 | 20 |
| | | | | | Free Air | Parchment Box Dist in feet | |

Figure 5:
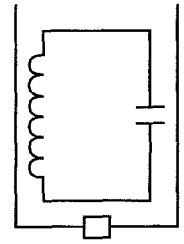
FIG. 5 is a cross-sectional view of the second embodiment taken along line 5-5 of FIG. 4.
Figure 6:
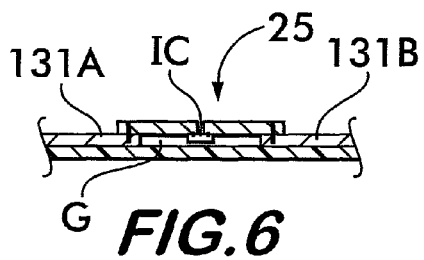
FIG. 6 is a cross-sectional view of the second embodiment taken along line 6-6 of FIG. 4.

FIGS. 5-6 depict the construction of the combination tag 20B. As can be seen from FIG. 5, the tag 20B is supported on a carrier or substrate 123 to which the EAS security element 124 is attached. Similarly, the loop antenna 130 is also secured to the carrier or substrate 123. FIG. 6 shows how the chip strap 25 is coupled across a gap G between the loop antenna ends 131A and 131B.

Figure 8A:
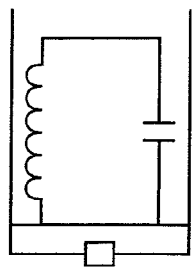
FIG. 8A is an alternative equivalent circuit of the combination EAS/UHF tag of FIG. 4.
Figure 9:
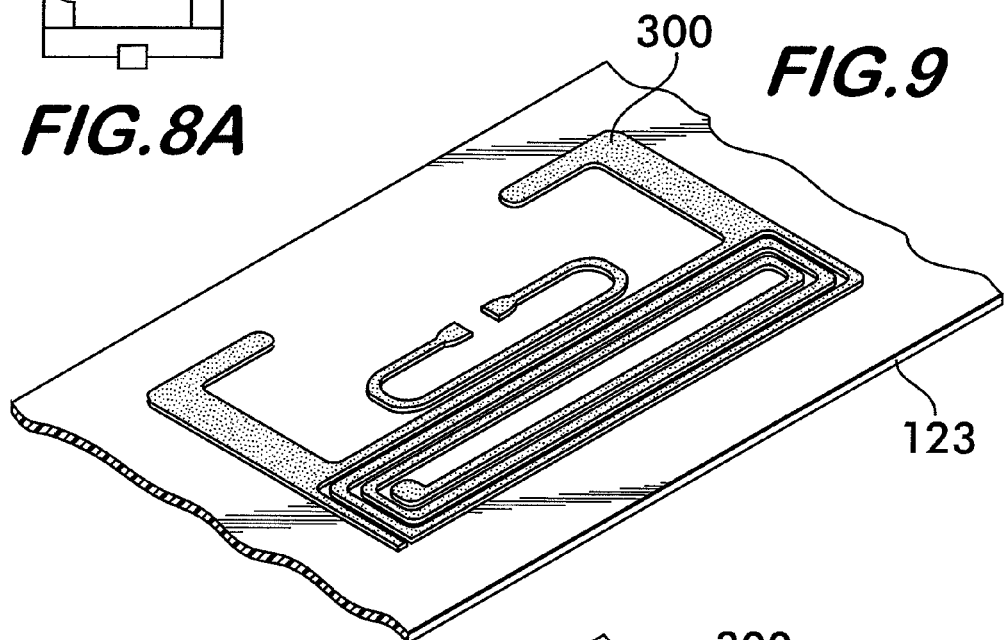
FIG. 9 depicts an isometric view of a patterned adhesive applied to a substrate where the patterned adhesive is in the form of combination EAS/UHF tag of FIG. 2.

FIG. 8A is an equivalent circuit of another similar embodiment.

Figure 10:
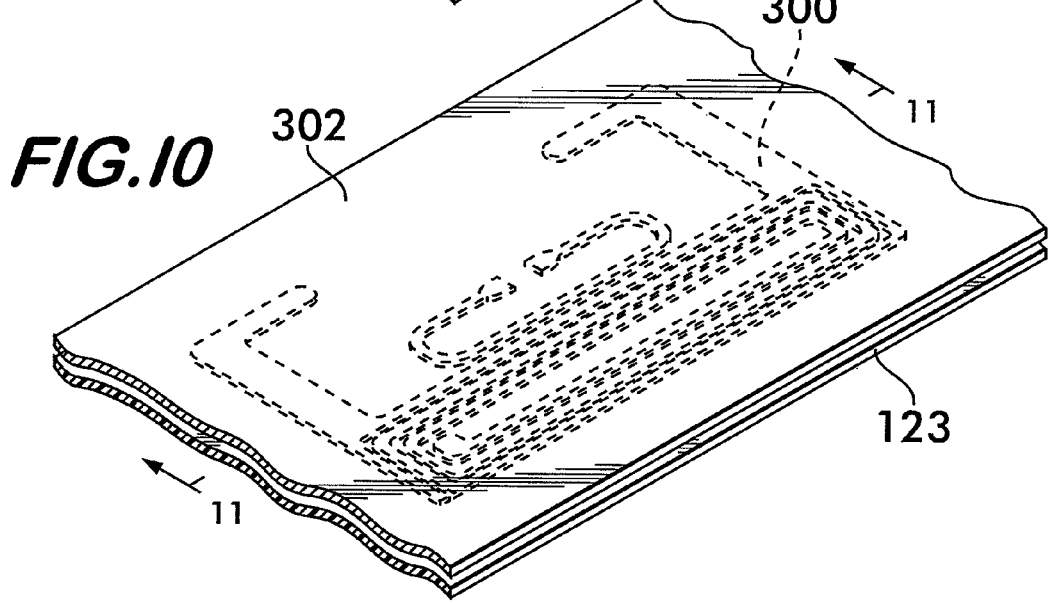
FIG. 10 depicts a layer of conductive material (e.g., aluminum) that is applied on top of the patterned adhesive to form a laminate.
Figure 11:
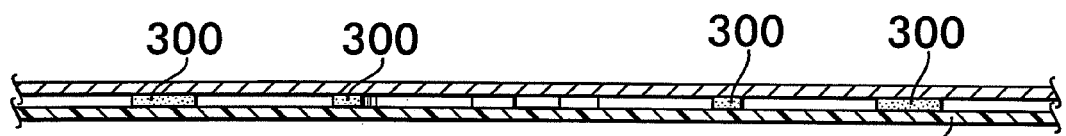
FIG. 11 is a cross-sectional view of the laminate of FIG. 10 taken along line 11-11 of FIG. 10.
Figure 12:
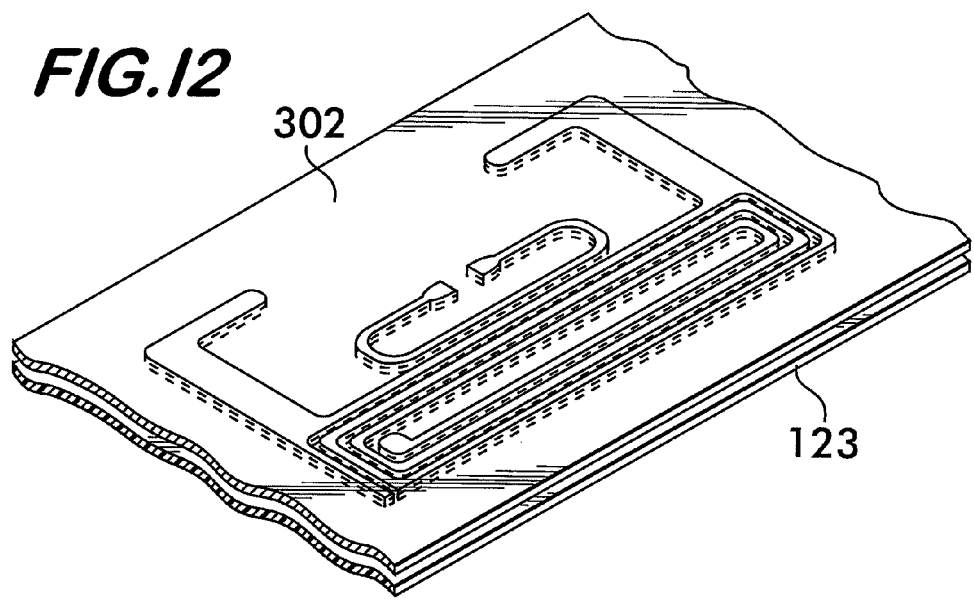
FIG. 12 depicts the layer of conductive material being cut in the form of the patterned adhesive.
Figure 13:
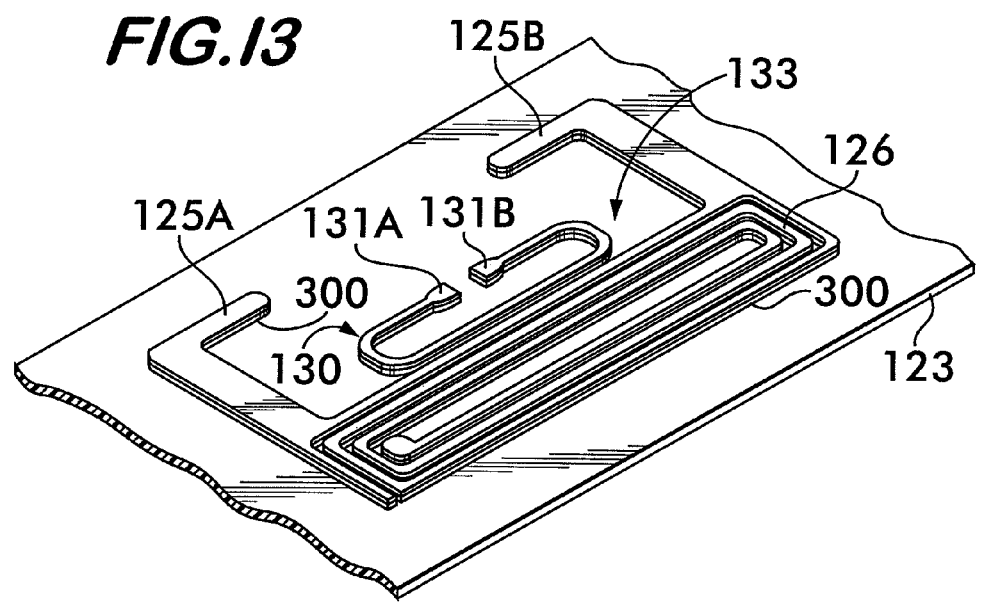
FIG. 13 depicts the layer of conductive material that is adhesively secured to the substrate while the portions of the layer of conductive material that are not adhesively secured to the substrate have been removed.

The formation of the combination EAS/UHF tag 20B is shown in FIGS. 9-19. In particular, a patterned adhesive 300 (FIG. 9) is initially applied to the substrate layer 123. Next, as shown in FIGS. 10-11, a conductive layer 302 (e.g., aluminum) is applied on top of the patterned adhesive 300. As shown in FIG. 12, the conductive layer 302 is cut into the shape of the patterned adhesive 300. The portion of the conductive layer 302 under which there is no patterned adhesive 300 is removed, thereby leaving the desired coil 126 and partial capacitor 128 configuration, augmented by the integral dipole antenna elements 125A and 125B, as shown in FIG. 13. To complete the combination tag 20B is to position the upper capacitor plate 128 over a portion of the dipole element 125A and to couple the chip strap 25 to the loop antenna 130. FIG. 14 depicts a web 304 comprising a plurality (only one of which is shown) of capacitor plates 128A. The web 304 is positioned such that one capacitor plate 128 is registered properly with a portion of the dipole antenna element 125A. It should be noted that the capacitor plate 128A comprises a first adhesive layer 306, a conductive layer 308 and a second adhesive layer 310. The first adhesive layer 306 makes direct contact with the portion of the dipole antenna 125A and acts as the dielectric layer of the capacitor 128. The conductive layer 308 forms the actual "other plate" of the capacitor 128. The second adhesive layer 310 releasably secures the capacitor plate 128A to the web 300 prior to its application to the portion of the dipole antenna 125A.

As can be seen in FIG. 15, a roller 312 (rotating counterclockwise) applies pressure against the back side of the web 300 to release the capacitor plate 128A from the web 300 and to apply it to the dipole portion 125A. Because the first adhesive layer 306 comprises a stronger adhesive than the second adhesive layer 310, upon application of pressure by the roller 312, the capacitor plate 128A disengages from the web 300. At this point, one end of the conductive layer 308 needs to be electrically coupled to the coil 126. To that end, as shown in FIG. 16, a crimp (or hot stamp, etc.) is applied to form an electrical connection between one end 314 (FIG. 14) of the capacitor plate 128A and a conductive terminal 316 (also FIG. 14) on the coil 126. As a result, the capacitor 128 is formed.

The remaining step is to couple the chip strap 25 to the loop antenna 130. As shown in FIG. 17, a web 318 comprising a plurality (only one of which is shown) of chip straps 25 is positioned such that one chip strap 25 is registered properly with loop antenna ends 131A/131B.

It should be noted that the chip strap 25 comprises a first adhesive layer 320 (as shown most clearly in FIG. 19), conductive elements 322A/322B and a second adhesive layer 324. The first adhesive layer 320 makes direct contact with the loop antenna ends 131A/131B. The conductive elements 322A/322B for the conductive extensions of the IC of the chip strap 25. The second adhesive layer 310 releasable secures chip strap 25 to the web 318 prior to its application to the loop antenna ends 131A/131B.

As can be seen in FIG. 18, a roller 326 (rotating counterclockwise) applies pressure against the back side of the web 318 to release the chip strap 25 from the web 318 and to apply it to the loop antenna ends 131A/131B. Because the first adhesive layer 320 comprises a stronger adhesive than the second adhesive layer 324, upon application of pressure by the roller 326, the chip strap 25 disengages from the web 318. At this point, the conductive elements 322A/322B need to be electrically coupled to the loop antenna ends 131A/131B, respectively. To that end, as shown in FIG. 19, a hot weld/crimp is applied to form an electrical connection between the respective conductive element (322A and 322B) and its corresponding loop antenna end (131A and 131B). As a result, the RFID loop antenna 130 is formed.

Figure 22:
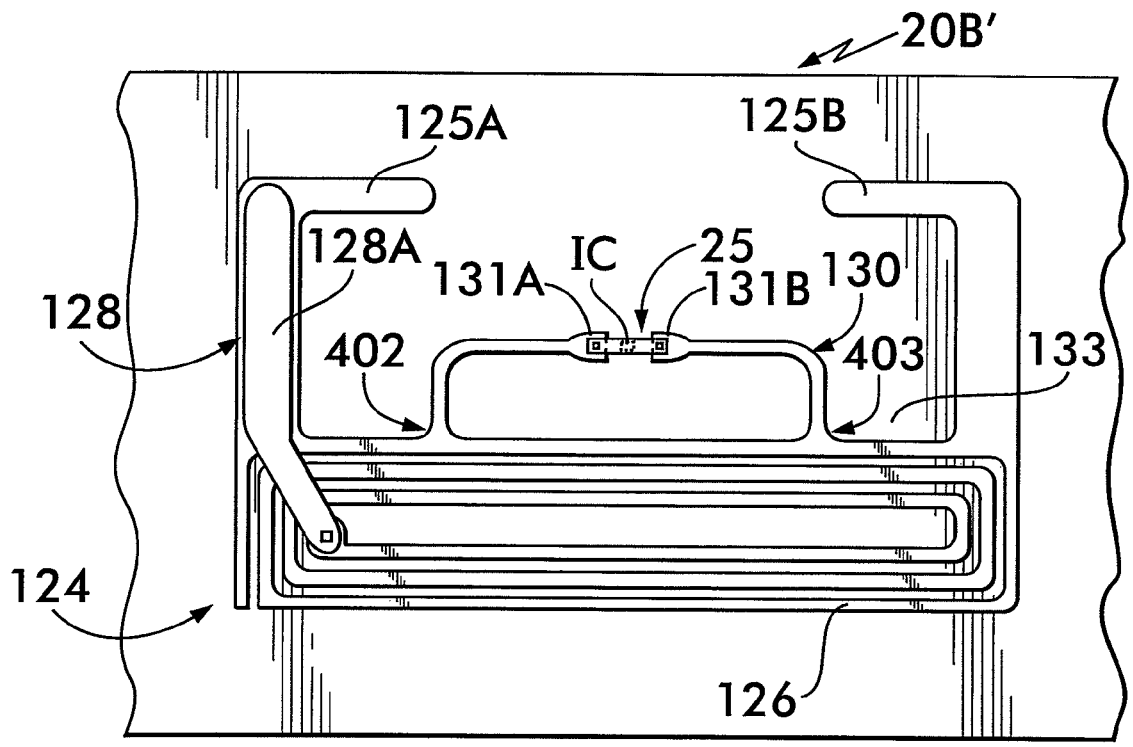
FIG. 22 is a third embodiment, which is an alternative version of the second embodiment, of a combination EAS/UHF tag that is formed to have an integrated dipole configuration with the coil portion of the EAS element along with an RFID loop directly coupled to the EAS element.
Figure 23:
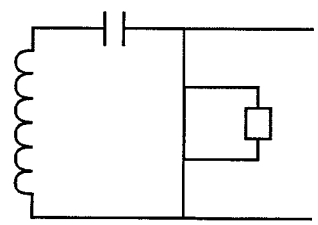
FIG. 23 is an equivalent circuit of the combination EAS/UHF tag of FIG. 22.

FIG. 22 depicts a third embodiment which is an alternative version 20B' of the combination EAS/UHF tag 20B whereby an EAS security element 124, using a coil 126 and capacitor 128 configuration, is augmented by integral dipole antenna elements 125A and 125B, and the RFID loop 130 and all of which are formed from a common conductive layer. FIG. 23 is an equivalent circuit of the EAS/UHF tag 201B'. Every aspect of the alternative version 201B' is the same with regard to the second embodiment 20B, as described previously. The only difference is that the loop antenna 130 is directly coupled with the coil 126 via bridges 402 and 403. In addition, the formation of the alternative version 20B' would include the bridges 402/403 in FIGS. 9-10 and 12-13.

It should be understood that the order in which the capacitor plate 128 and the chip strap 25 are applied does not limit the method of the present invention; either one could be applied first or substantially simultaneously.

Figure 24:
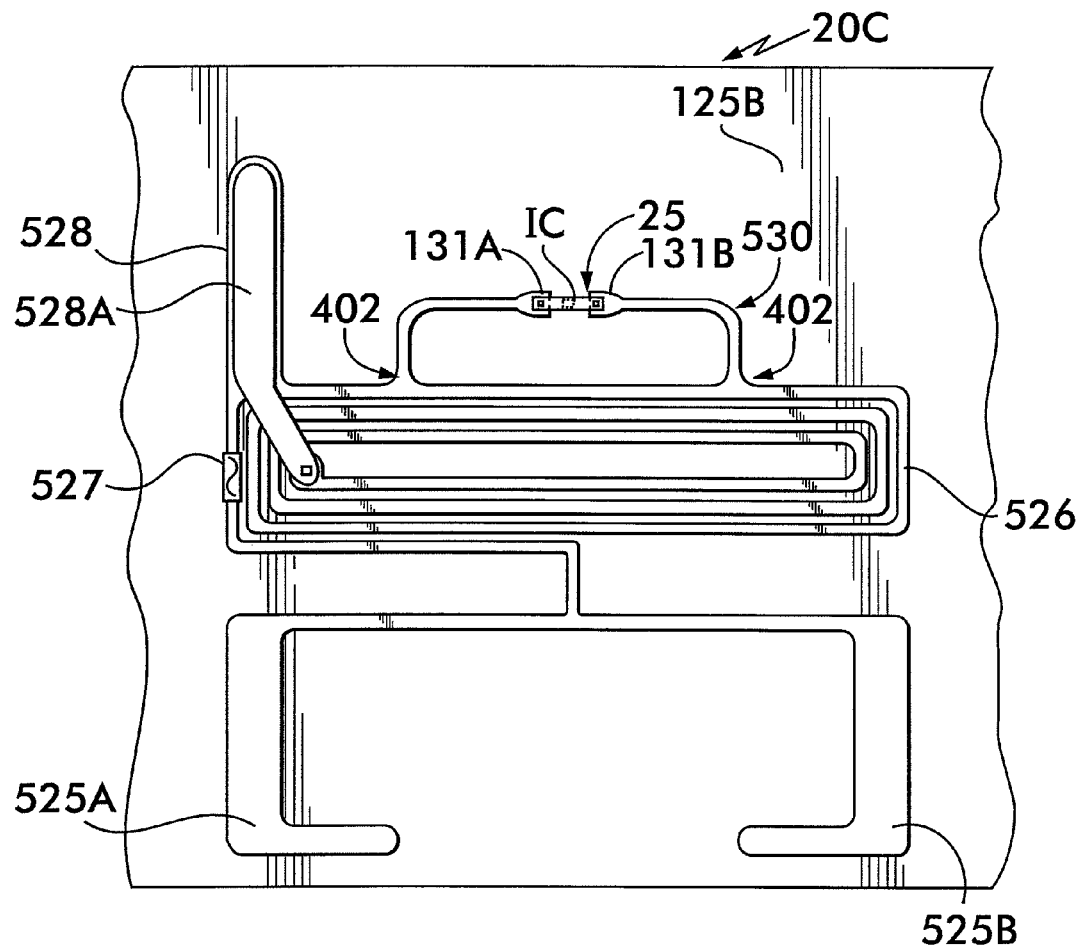
FIG. 24 is a fourth embodiment of a combination EAS/UHF tag that includes an RFID loop directly coupled to an EAS element and also includes a dipole connected to the EAS element via a deactivation element for providing the combination EAS/UHF tag with a far field and near field read capability.
Figure 25:
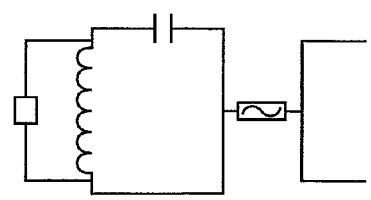
FIG. 25 is an equivalent circuit of the combination EAS/UHF tag of FIG. 24.

FIGS. 24-25 depict a fourth embodiment 20C whereby a security tag is deactivatable from a far-field configuration to a near field configuration. This provides a large advantage to customers in that an item returned to a store should not set off security alarms but should provide the return desk with item/pricing information when the tag is scanned at the return desk. Thus, by deactivating the far field mechanism, the security tag prevents alarms from going off but still allows the tag to be interrogated for its item ID and pricing.

In particular, as shown in FIG. 24, the fourth embodiment 20C has some similarity to the third embodiment in that it comprises an RFID loop 530, an EAS security element 524 (having a coil 526 and a capacitor formed from plates 528 and 528A) and dipole elements 525A and 525B. However, unlike the third embodiment 20B', the dipole elements 525A and 525B are not integrally formed with the EAS security element coil 526; instead, a deactivation element 527 (e.g., a fuse, a dimple, or any other type of mechanism that can operate to disconnect) forms a portion of the EAS security element coil 526 that connects to the dipole elements 525A/525B. During normal operation when the combination EAS/UHF tag 20C is exposed to the interrogation field (UHF frequency range), the response signal including the RFID content can be read 3-4 meters (approximately 15-20 ft) away which is considered "far-field". However, if the tag should be exposed to a deactivation field such the deactivation element 527 is operative, the dipole elements 525A and 525B are removed from the response signal transmission, thereby relying simply on the EAS security element 524 to transmit the response signal. The read distance via the EAS security element including the RFID content is approximately 1 foot which is considered the "near field."

While the invention has been described in detail and with reference to specific examples thereof, it will be apparent to one skilled in the art that various changes and modifications can be made therein without departing from the spirit and scope thereof.

What is claimed is:

1. A security tag comprising:
   an electronic article surveillance (EAS) element, said EAS element comprising a resonant circuit formed of a coil and a capacitor, said coil comprising a first extension, constituting a first capacitor plate, on a first side of said coil and a second extension on a second side, opposite to said first side, of said coil, said second extension comprising a pair of elements constituting a dipole antenna, said capacitor comprising a conductive layer, constituting a second capacitor plate, having one end electrically coupled to one end of said coil and wherein said conductive layer is disposed on top of said first extension with a dielectric layer disposed in between said conductive layer and said first extension; and
   an ultrahigh frequency (UHF) element, said UHF element comprising a loop antenna coupled to a radio frequency (RFID) integrated circuit, said loop antenna having a portion that coincides with said coil on said first side.

2. The security tag of claim 1 wherein said deactivation element is a fuse.

3. A method of producing a security tag comprising: an electronic article surveillance (EAS) element comprising a resonant circuit formed of a capacitor and a coil, and an ultrahigh frequency (UHF) element comprising an RFID integrated circuit coupled to dipole elements, said method comprising:
   providing a substrate;
   applying an adhesive to said substrate in a pattern corresponding to said coil of the EAS element and to dipole elements of the UHF element and wherein said adhesive is applied in the form of said coil and in the form of a band that surrounds said adhesive in the form of said coil except at one location to form said dipole elements;
   applying a conductive layer to said adhesive;
   cutting said conductive layer to form both said coil of said EAS element and said dipole elements of said UHF element;
   applying an RFID chip strap to said dipole elements of said UHF element, and applying a capacitor strap to said coil of said EAS element; and
   electrically coupling said RFID chip strap to said dipole elements of said UHF element, and electrically coupling ends of said capacitor strap to said coil of said EAS element with an insulator layer disposed between said capacitor strap and said coil.

4. A method of producing a security tag comprising: an electronic article surveillance (EAS) element comprising a resonant circuit formed of a capacitor and a coil and an ultrahigh frequency (UHF) element comprising an RFID integrated circuit coupled to a loop antenna, said method comprising:
  providing a substrate;
  applying an adhesive to said substrate in a pattern corresponding to:
    said coil having open ended extensions that face each other, wherein said open ended extensions constitute a dipole antenna and wherein one of said open ended extensions constitutes a first capacitor plate of said capacitor; and
    a loop antenna having a pair of open ends, said loop formed of adhesive being located between said open ended extensions that face each other, and having a portion that coincides with said coil;
  applying a conductive layer to said adhesive;
  cutting said conductive layer to form:
    the EAS element comprising said coil and said open ended extensions that face each other; and
    the UHF element comprising said loop antenna having said pair of open ends;
  applying an RFID chip strap across said open ends of said loop antenna of said UHF element, and applying a second capacitor plate to said coil of said EAS element; and
  electrically coupling said RFID chip strap to said loop antenna of said UHF element and said capacitor plate to said coil of EAS element.

5. A method of producing a security tag comprising: an electronic article surveillance (EAS) element comprising a resonant circuit formed of a capacitor and a coil and an ultrahigh frequency (UHF) element comprising an RFID integrated circuit coupled to a loop antenna, said method comprising:
  providing a substrate;
  applying an adhesive to said substrate in a pattern corresponding to:
    said coil having a first extension, constituting a first capacitor plate, on one side of said coil, and a second extension on a second opposite side of said coil, wherein said second extension comprise a pair of elements constituting a dipole antenna; and
    a loop antenna having a pair of open ends and a portion that coincides with said coil on said first side;
  applying a conductive layer to said adhesive;
  cutting said conductive layer to form:
    the EAS element comprising said coil, said first extension and said second extension; and
    the UHF element comprising said loop antenna having said pair of open ends and which coincides with said coil on said first side;
  applying an RFID chip strap across said open ends of said loop antenna of said UHF element, and applying a second capacitor plate to said first extension of said EAS element while disposing a dielectric layer between said second capacitor plate and said first extension;
  electrically coupling said RFID chip strap to said loop antenna of said UHF element and said capacitor plate to said coil of EAS element; and
  wherein said step of cutting said conductive layer to form a portion of said EAS elements comprises including a deactivation element in said coil.

6. The method claim 5 wherein said deactivation element is a fuse.

* * * * *